Patented Dec. 22, 1942

2,305,691

UNITED STATES PATENT OFFICE 2,305,691

ANTHRAQUINONE DYESTUFF PREPARATION

Paul Grossmann, Binningen, Switzerland, assignor to the firm Society of Chemical Industry in Basle, Basel, Switzerland No Drawing. Application October 4, 1940, Serial No. 359,805. In Switzerland October 16, 1939

8 Claims. (Cl. 8—82)

It is an object of the present invention to provide an improved process for the manufacture of anthraquinone derivatives containing nitrogen.

It is a further object of the present invention to provide an improved process for the manufacture of polyamino-anthraquinonyl-monoamino alkylcarboxylic acids.

It is a further object of the present invention to provide new water-soluble dyestuff preparations useful for dyeing acetate rayon which can easily be handled and marketed and which dye valuable blue tints.

Further objects will partly be obvious and will partly appear hereinafter.

It has already been proposed to dye acetate rayon with a product designated as 1:4:5:8-tetraminoanthraquinone monoalanine or with a product described as glycine of 1:4:5:8-tetraminoanthraquinone. Whereas the known process for obtaining the first named product is defective in several ways no process at all is given for preparing the second one. Nor is any indication given how many glycine residues are contained in this last mentioned product. In any case it is interesting to see that none of these products is available on the market until now, although, as applicant has ascertained, they are very valuable dyestuffs and although no other blue water-soluble dyestuff having good affinity for acetate rayon is as yet available on the market.

It has been found that anthraquinone derivatives containing nitrogen may be prepared by causing aliphatic halogen-carboxylic acids to react upon aminoanthraquinones, containing at least three amino groups, in the presence of indifferent solvents.

Aminoanthraquinones containing at least three amino groups, which may serve as parent substances in the present process, are, for example, triaminoanthraquinones, such as 1:4:5-triaminoanthraquinone, and tetraminoanthraquinones, such as 1:4:5:8-tetraminoanthraquinone, 1:4:5:6-tetraminoanthraquinone, 1:4:5:7-tetraminoanthraquinone, as well as mixtures of these products and their alkyl or aryl substitution products.

Among halogen-carboxylic acids of the lower aliphatic series which may be allowed to react with the aminoanthraquinones the following, for example, come into consideration: chlor- and bromacetic acids, halogen-propionic acid, halogen-hydroxy-propionic acid, and halogen-butyric acid.

The most varied compounds serve as dispersing agents which may have also a dissolving action, for example, glacial acetic acid, solvent naphtha and nitrobenzene; but it is particularly advantageous to make use of compounds which contain at least one phenolic hydroxyl group, as is the case with phenols and cresols.

The action of the aliphatic halogen-carboxylic acid on the aminoanthraquinones is preferably carried out in the presence of acid-binding agents, such as alkali metal acetates or alkali metal carbonates, oxides of the alkaline earths, such as calcium or magnesium oxide, or tertiary bases. Sufficient of the acid-binding agent should be used to ensure complete binding of the halogen hydracid formed during the reaction but not so much that the whole of the aliphatic halogen-carboxylic acid is converted into its salt.

Particularly good results are obtained if the action of the aliphatic halogen-carboxylic acids takes place under such conditions that substantially one molecule of the aminoanthraquinone reacts with one molecule of the aliphatic halogen-carboxylic acid. A reaction which proceeds in this fashion may be attained by suitable choice of the amounts of the components entering into the reaction, of the quantity or kind of dispersing agent, the quantity or kind of the acid-binding agent, the period of reaction, the reaction temperature—which, preferably, should not be above 140° C., and which, in many cases, should be appreciably lower, for instance, 100° C.—or by use of an agent which facilitates the splitting-off of halogen hydride, such as copper or one of its compounds. In many cases, it is preferable that the reaction between the aminoanthraquinones and the aliphatic halogen-carboxylic acids should not be carried so far that the amino-anthraquinones are completely converted into products, the salts of which are soluble in water; in such circumstances, the aminoanthraquinones which are not converted into the water-soluble form may be separated from the reaction mixture and used as starting material for a further operation.

The products obtained by the present process may be isolated in the usual manner, for example, by acidification of their aqueous solutions, or by salting out, but attempts to dry them often meet with serious difficulties insofar as insoluble or unstable products are frequently obtained thereby. It has been found that the products obtained may advantageously be dried in the presence of alkaline buffer substances. This operation may be carried out either by drying the carboxylic acids—which, for example, may have been precipitated by the addition of acid and washed, if desired—with an excess of an alkaline buffer substance, the quantity of which is more than sufficient to convert the carboxylic acids into their alkali metal salts, or the carboxylic acids, incompletely neutralized with alkali metal hydroxides, may be dried together with a quantity of an alkaline buffer substance which is more than sufficient to convert the residual quantity of carboxylic acid into the alkali metal salt. These alkaline buffer substances, which must be of a definitely alkaline nature but which must impart a lower pH value than that yielded by the alkali metal hydroxides, are, for example, especially alkali metal salts of weak acids, such as sodium carbonate, borax, sodium para-toluene sulphamide, and the like.

In the form of their water-soluble salts, the products obtainable by the present process dye cellulose esters and ethers, for example, acetate rayon, in fast, strong blue shades from their aqueous solutions. Mixtures of the dyestuffs obtained according to the present process may also be used advantageously for dyeing, such mixtures in many cases possessing a higher degree of solubility and yielding deeper dyeings than is the case where the individual dyestuffs are concerned.

The following examples illustrate the invention, the parts being by weight:

Example 1

13.4 parts of 1:4:5:8-tetraminoanthraquinone are warmed in 50 parts of glacial acetic acid with 9.4 parts of chloracetic acid, 13 parts of potassium acetate of 90 per cent. strength and 0.1 part of copper acetate for 4 hours at 110–120° C. The reaction product is precipitated by addition of water, filtered, dissolved in dilute alkali, filtered free from insoluble parent substances, precipitated with acid, filtered, and washed with water until neutral. The product obtained dyes acetate rayon in strong blue, fast shades from weakly alkaline solutions, i. e. solutions containing ammonia, soap, soda, or pyridine.

Example 2

13.4 parts of 1:4:5:8-tetraminoanthraquinone are heated in 100 parts by volume of solvent naphtha with 5.7 parts of chloracetic acid and 5 parts of potassium acetate of 90 per cent. strength for 6 hours at 110–120° C. The solvent naphtha is removed by steam distillation and the reaction product is dissolved in dilute alkali, filtered and precipitated by weak acidification. The product thus obtained, which probably possesses the formula

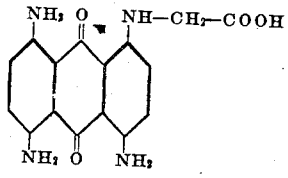

dyes in a similar manner to the dyestuff obtained in Example 1. The new dyestuff may be dried under diminished pressure with an addition of about 10 parts of borax.

Example 3

13.4 parts of 1:4:5:8-tetraminoanthraquinone are heated in 50 parts of crude cresol with 6.7 parts of chloracetic acid and 6 parts of potassium acetate of 90 per cent. strength for ¾ hour at 100° C. The cresol is removed by steam distillation, and the residue is dissolved in dilute ammonia, filtered and precipitated by weak acidification. The dry sodium salt may be obtained by careful drying with an addition of about 5 parts of soda. The new dyestuff dyes acetate rayon in fast blue shades; it possesses the probable formula

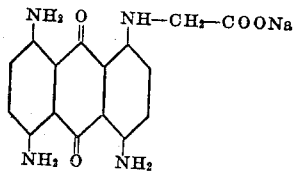

If, in place of 1:4:5:8-tetraminoanthraquinone, 1-hydroxy-4:5:8-triaminoanthraquinone, 1-hydroxy-4:5-diamino-8-methylamino-anthraquinone, 1-anilido-4:5:8-triaminoanthraquinone, or 1:4:5-triamino-8-(4'-aminophenyl)-aminoanthraquinone be used in an analogous manner, dyestuffs are obtained which dye acetate rayon in blue to blue-green shades.

Example 4

13.4 parts of a crude mixture of 1:4:5:6- and 1:4:5:7-tetraminoanthraquinone are heated in 50 parts of crude cresol with 11.4 parts of chloracetic acid, 10 parts of potassium acetate of 90 per cent. strength and 0.1 part of copper acetate for 4 hours at 100–110° C. The dyestuff is isolated as described in Example 3. It dyes blue shades.

Example 5

13.4 parts of 1:4:5:8-tetraminoanthraquinone are heated in 50 parts of crude cresol with 11.4 parts of chloracetic acid, 5.3 parts of soda and 0.1 part of copper acetate for some hours at 110–115° C. The dyestuff is isolated as described in Example 3. It dyes fast blue shades.

Example 6

13.4 parts of 1:4:5:8-tetraminoanthraquinone are heated in 50 parts of crude cresol with 8 parts of potassium acetate of 90 per cent. strength, 8 parts of β-chloropropionic acid and 0.1 part of copper acetate for 3 hours at 100–110° C. The dyestuff is isolated as described in Example 3. It dyes acetate rayon in blue shades.

Example 7

67 parts of 1:4:5:8-tetraminoanthraquinone are dispersed in 250 parts by volume of crude cresol and, after addition of 33.5 parts of chloracetic acid and 30 parts of anhydrous potassium acetate of 90 per cent. strength, are heated for 45 minutes at 100° C. whilst stirring. 35 parts by volume of a concentrated solution of ammonia are now added, and the crude cresol is removed by steam distillation. Finally, 150 parts by volume of a concentrated solution of ammonia are added to the residue from the distillation and, after some stirring, the mixture is filtered and the residue is washed with water. The filtered residue, which can amount to as much as ⅓ of the original dyestuff quantity, is used as starting material for a subsequent operation. The dyestuff is separated from the filtrate by addition of sulfuric acid until the liquor has an acid reaction to litmus. After thorough washing with weakly acidified wash-water, the dyestuff which is filtered off is mixed with about 80 per cent. of the calculated quantity of caustic soda of 34 per cent. strength, stirring well. 35–40 parts of borax, soda, secondary sodium phosphate or sodium para-toluene sulfamide are added, and the mixture is dried at about 60° C. under reduced pressure.

Example 8

1 part of the dyestuff obtained in Example 7 is dissolved in 200 parts of warm water.

60 parts of this solution are diluted to 300 parts. In this liquor 10 parts of acetate rayon are dyed, with an addition of 30 per cent. Glauber's salts, for 1½ hours at 80° C., after which it is rinsed and dried. The acetate rayon is dyed in a deep blue, fast shade.

Example 9

0.9 part of 1:4:5:8-tetraminoanthraquinone-mono-glycine sodium salt and 0.1 part of 1-hydroxy-4:5:8-triaminoanthraquinone-mono-glycine sodium salt are dissolved in 200 parts of water. 60 parts of this solution are diluted to 300 parts and this diluted bath is used for dyeing as described in Example 8. A deep blue, fast dyeing is obtained in this case also.

By the term "dispersing agents belonging to the phenol group" is to be understood phenol, the different cresols, mixtures of these bodies as well as the crude cresol mixtures available in the chemical trade.

By the term "alkaline buffer substance" is to be understood a water-soluble alkali metal salt of a weak acid, such as sodium carbonate, borax, the sodium salt of para-toluene-sulfamide, etc., all substances which are suitable for securing a definite alkaline reaction which is however of substantially lower pH than that obtained with alkali metal hydroxides.

What I claim is:

1. Water-soluble and substantially stable dyestuff preparations, comprising an alkaline buffer substance and an alkali metal salt of an anthraquinonyl-monoamino-acetic acid containing at least two further amino groups in the anthraquinone nucleus.

2. Water-soluble and substantially stable dyestuff preparations, comprising an alkaline buffer substance and an alkali metal salt of a triaminoanthraquinonylamino-acetic acid.

3. Water-soluble and substantially stable dyestuff preparations, comprising an alkaline buffer substance and an alkali metal salt of 1:4:5-triamino-anthraquinone-8-aminoacetic acid.

4. Alkali metal salts of 1:4:5-triamino-anthraquinone-8-aminoacetic acid in the form of a water-soluble and substantially stable preparation, stabilized with borax.

5. Process for the manufacture of water-soluble and substantially stable dyestuff preparations, comprising drying a water-containing mixture of an alkaline buffer substance and an alkali metal salt of an anthraquinonyl-mono-aminoacetic acid containing at least two further amino groups in the anthraquinone nucleus.

6. Process for the manufacture of water-soluble and substantially stable dyestuff preparations, comprising drying a water-containing mixture of an alkaline buffer substance and an alkali metal salt of a triaminoanthraquinonylamino-acetic acid.

7. Process for the manufacture of water-soluble and substantially stable dyestuff preparations, comprising drying a water-containing mixture of an alkaline buffer substance and an alkali metal salt of an 1:4:5-triaminoanthraquinone-8-aminoacetic acid.

8. Process for the manufacture of water-soluble and substantially stable dyestuff preparations, comprising drying a water-containing mixture of borax and the sodium salt of 1:4:5-triaminoanthraquinone-8-aminoacetic acid under reduced pressure.

PAUL GROSSMANN.